UNITED STATES PATENT OFFICE 2,622,036

PROCESS FOR THE TREATMENT OF KERATIN AND RELATED MATERIALS

Peter Alexander and Christopher Earland, Leicester, England, assignors to Wolsey Limited, Leicester, England, a British company No Drawing. Application August 23, 1950, Serial No. 181,097. In Great Britain September 15, 1949

17 Claims. (Cl. 106—155)

This invention relates to the treatment of keratin and other protein materials of high cystine content in order to render them soluble in dilute alkali or other solvents which do not chemically degrade the protein. These materials are insoluble in water and all solutions or solvents which do not attack them chemically. Materials falling into this class are the protein constituent of wool and all animal hairs, bristles, horns and epidermal layers such as animal hooves. There are many ways of bringing these into solution (for example, refluxing for many hours with strong mineral acids; treatment with caustic alkali solutions) but in all these the protein is broken down into very small molecular fragments (for example individual amino acids) and the product thus obtained bears no resemblance to the original starting material.

One way of rendering these materials soluble without severe degradation is to treat them with alkaline reducing agents which break the disulphide bond so as to yield sulphydryl groups. Sodium sulphide and compounds containing the thiol group such as the salts of thioglycollic acid have been used for this purpose. These processes suffer from several disadvantages:

(1) The reagents used have an objectionable odour which is retained to some extent by the product;

(2) They must be used under severely alkaline conditions which degrade the proteins in general and the attack is not confined to the disulphide bond alone. The product is therefore discoloured and less suitable for many purposes such as making regenerated protein fibres;

(3) If less alkaline conditions are used all the protein cannot be brought into solution.

It is an object of this invention to provide a process for the treatment of keratin and related protein materials of high cystine content to render them soluble in certain solvents by oxydising the —S—S— bond to sulphonyl and sulphonic acid groups without substantial attack of any other part of the protein molecule and in particular without causing any substantial degradation of the main peptide chain.

It is a further object of this invention to oxidise keratin and related protein materials of high cystine content with a saturated per-aliphatic acid having not more than four carbon atoms in the molecule.

It is a still further object of the invention to convert the solutions thus obtained into fibres or other articles of keratinous material.

Thus, according to the process of the present invention keratin or related protein material of high cystine content is oxidised with a solution of a saturated per-aliphatic acid having not more than four carbon atoms in the molecule, and the whole or a part of the oxidised protein is dissolved in a solvent which is a hydrotropic substance, preferably a dilute alkali, for example a dilute ammonia solution.

To aid solution of the oxidised protein, wetting agents such as long chain fatty sulphonates may often with advantage be added.

Hydrotropic substances are able to break hydrogen bonds; they include, in addition to ammonium hydroxide, solutions of cuprammonium; copper ethylenediamine, phenol containing water, resorcinol containing water, formic acid, phosphonic acid, and in some cases their aqueous solutions, very concentrated aqueous solutions of lithium halides and lithium thiocyanate, concentrated aqueous solutions of zinc chloride, concentrated aqueous solutions of urea and substituted urea derivatives such a guanidine. The protein which dissolves in these substance (heating in some cases being necessary) can be precipitated in most cases on dilution and in all cases by being extruded into strong solutions of simple electrolytes such as sodium sulphate or sodium chloride or into an acidic bath such as N/100 hydrochloric acid, or into alcohols or ketones dissolved in water.

Thus, for example, when oxidised keratin is dissolved in a 20% aqueous urea solution of pH=8, the oxidised keratin does not precipitate by mere dilution with water, but the addition of a trace of acid is necessary to lower the pH of the diluting solution to 4, or the diluting solution must contain strong electrolyte, e. g. a 20% sodium sulphate solution. From a 20% aqueous urea solution at pH 4, however, the material precipitates as soon as it has been diluted five times with water.

This material is of high molecular weight and may be used as a foodstuff or for making plastic articles or fibres. Thus, the precipitate may be re-dissolved and exuded through a spinnerette into an acid coagulating bath.

If the precipitation of the material is effected by acid then ammonium or other alkali is necessary to redissolve it, but if it is precipitated by a solution of a strong electrolyte or an aqueous solution of an alcohol or ketone, then it will dissolve in water.

The material can be rendered insoluble in dilute alkali by cross linking with well known reagents such as formaldehyde or heavy metal salts. In general, the soluble material can be insolubilised by most of the processes known in the art of making regenerated protein fibres.

Instead of precipitating the oxidised protein from solution a solid can also be obtained by allowing the solution to evaporate.

Thus, the material is soluble in liquid ammonia to some extent, and can be recovered by allowing the ammonia to evaporate, e. g. if it is desired to obtain fibres by extruding the liquid ammonia solution through a spinnerette into air.

From dilute aqueous alkali solutions, in particular ammonia, good films can be obtained by casting a film and allowing the ammonia to evaporate. Good fibres can be obtained by spinning the solution into a vacuum or into hot air where the aqueous ammonia is quickly evaporated. The material thus obtained has very similar properties to that obtained by precipitation from the ammonia solution with acids or strong salt solutions (i. e. the product is again readily soluble in dilute alkali and has a structure which gives an X-ray diffraction diagram corresponding to the material known as $\alpha$ keratin). This same product is obtained when the material is precipitated with water, strong salt solutions or acid from any of the solvents mentioned above.

When the material is extruded from a volatile non-aqueous solvent containing no water or only very little water, such as formic acid, on evaporation of the solvent a material is obtained which is characterised by being soluble much less readily in dilute alkali such as N/10 ammonia and which gives an X-ray diffraction pattern corresponding to the material known as $\beta$ keratin. Shaped articles obtained in this way in the $\beta$ form are less elastic but much stronger than those in the $\alpha$ form. The $\beta$ materials can be hardened and completely insolubilised with formaldehyde and heavy metal salts in the same way as all protein products.

We have found that wool though of complex structure has an interior consisting of keratin in the $\alpha$ form but coated with a cuticle which consists largely of the $\beta$ configuration. We have succeeded in imitating this effect by spinning a solution consisting of 15% of the oxidised wool as obtained with peracetic acid dissolved in N/5 ammonia through a spinnerette into a coagulating bath consisting of 20% sodium sulphate. The fibres were dried and then passed rapidly through formic acid, which was then evaporated. The whole fibre was then hardened and insolubilised with formaldehyde. It is believed that the product obtained consists of a fibre with a highly elastic central portion surrounded by a tough and relatively inelastic outer layer.

Immediately after peracetic acid treatment the keratin is soluble in dilute alkali, e. g. N/10 ammonia, and some of the solvents mentioned, e. g. 100% lithium bromide (100 gms. of salt in 100 ml. of water), 15% urea, 50% zinc chloride, but not in others such as formic acid. However, when the oxidised wool is dissolved in alkali, urea or lithium salts and then precipitated by dilution with water or dilute acid or strong salt solutions such as 20% sodium sulphate the precipitate obtained is then soluble in formic acid and liquid ammonia. The best method of obtaining a solution in formic acid is thus the following: treat the keratin with a peracid for the requisite time as described in the examples below, dissolve the product in N/5 ammonia, precipitate oxidised keratin by adding acid until the pH is less than 4, filter off and dry the precipitate, which then readily dissolves in formic acid in the cold.

The material which is not precipitated by acid is of low molecular weight and can be recovered by evaporating the solution or by salting out. The oxidation with the peracids is preferably carried out from aqueous solution although it can be done from solutions in non-oxidisable organic solvents such as carbon tetrachloride or white spirit. We prefer to use peracetic acid as its aqueous solutions are stable for many hours, whereas those of performic lose oxidising power on standing, and perpropionic acid and the perbutyric acids are more expensive.

In general, when using peracetic acid, a solution of the peracetic acid and acetic acid mixture obtained by reaction between hydrogen peroxide and acetic acid is used direct. The solution need not be acid in reaction and may be neutralised with alkalis (for example caustic soda). As soon as the solution becomes alkaline, however, it becomes very unstable and rapidly loses oxidising power. Even at a pH between 4 and 7 the solution becomes progressively less stable. It may be desirable to work at a pH between 4 and 7, however, as the oxidation reaction proceeds more rapidly than in the acid solution.

Similar considerations apply to the other peracids employed in the present invention which may also be used in the presence of the corresponding aliphatic acid of the general formula $C_nH_{2n+1}COOH$.

To render the protein completely soluble all the cystine must be oxidised and it is preferable to carry on the reaction till more than 90% of the cystine has reacted. The cystine content may be estimated by standard analytical methods. The time for this reaction depends upon (1) the pH as already mentioned; (2) the concentration of peracid which may be varied from the strongest obtainable by reacting the organic acid with hydrogen peroxide without subsequent concentration, which is about 45% by weight if the method of preparation of F. P. Greenspan (Ind. Eng. Chem., 1947, 39, 547) is followed, to very dilute solutions of less than 1% by weight; (3) the temperature of reaction which should, however, be kept below 100° C., as there is severe decomposition of peracid at this temperature and usually we prefer to use 20 to 60° C.; (4) the particle size or fibre diameter of the initial material.

The following Table I shows the solubility in 3/N ammonia of the oxidised product obtained by treating wool with peracetic acid for different percentages of cystine oxidised.

*Table I*

| Percent Cystine oxidised | Percent Soluble in 3/N ammonia |
| --- | --- |
| 20 | 8 |
| 45 | 9 |
| 75 | 11 |
| 90 | 91 |
| 100 | 92 |

The following examples illustrate how the process of the invention may be carried into effect:

1. 5 gms. of botany wool was suspended with stirring in a solution containing 45% by weight of peracetic acid for 1 hour at 22° C. After this it was filtered off and washed well about 5.1 gms. of wool being left (weight increase due to reaction —S—S—→2(—SO₃H) and 2(—SO₂). This was then suspended with stirring in 200 ml. of N/100 ammonia to which additions of ammonia were made, as this was used up. After about 1 hour all the wool had dissolved giving a viscous solution and leaving only a fine cloudiness of insoluble material. This was filtered off and found to be about 0.2 gm.

The ammonia solution may be used as such for preparing shaped articles, etc., or it may be acidified with N/10 HCl until all the precipitate has formed. This is collected and found to be 3.5 gms. of a white powder readily soluble in dilute alkali.

2. Example 1 was repeated but the oxidation was carried out for 24 hours in a 1.6% solution of peracetic acid obtained by diluting with water a mixture prepared according to Greenspan's psocess approximately 25 times. The yield of soluble protein was 70% as in Example 1.

If the reaction with peracetic acid is carried out for 30 mins. less than 50% of the wool is soluble in dilute ammonia.

3. Perpropionic acid was prepared by condensing 1 gm.-mol of 90% hydrogen peroxide with 1.5 gm.-mols of propionic acid in the presence of sulphuric acid and allowing the mixture to stand for 24 hours. 40 ml. of this solution was mixed with 60 ml. of water and 14 gms. of botany wool was suspended therein for 2 hours at room temperature. The wool was then removed and it was found that there was a slight gain due to oxidation. The thus treated wool was then dissolved in 1 litre of 0.2/N ammonia and 90% of it went into solution.

The protein can be recovered from this solution by acidification at a pH of less than 5 or by the addition of strong salts, such as 16% by weight of sodium sulphate plus 20% by weight of magnesium sulphate, but other strong electrolytes or mixtures of strong electrolytes work equally well as a precipitating medium.

The yield is 60–70%; that is, of each 100 parts by weight of wool which went into solution, 60–70 parts by weight are recovered on acidification or adding strong salts.

4. Perbutyric acid was prepared by condensing 1 gm.-mol of 90% hydrogen peroxide with 1.5 gm.-mols of butyric acid in the presence of sulphuric acid and allowing the mixture to stand for 24 hours. Example 3 was then repeated using perbutyric acid instead of perpropionic acid, all the other conditions being the same. Similar results were obtained.

5. From a solution of solubilised α keratin a regenerated protein fibre was obtained in the following way: The protein was prepared by oxidising solvent extracted virgin merino wool with an aqueous solution containing 16% of peracetic acid for 2 hrs. at room temperature, dissolving the wool in 0.3/N ammonium hydroxide, filtering off the insoluble residue and acidifying to a pH<4 with 0.1/N hydrochloric acid when a precipitate was formed which was filtered, washed with distilled water and dried. The powder was ground in a mill with 0.3/N ammonium hydroxide to give a solution containing 15% of protein which gelled at room temperature but gave a free flowing viscous solution suitable for spinning at 70° C. Accordingly, the protein solution was extruded at 70° C. through a spinnerette into a coagulating bath at the same temperature consisting of an aqueous solution of N sodium sulphate, 2N magnesium sulphate and 0.1% of Fixanol (this is a material manufactured by Imperial Chemical Industries, Ltd. and containing cetyl pyridinium bromide).

White filaments which could be readily handled were thus obtained. The fibres, however, readily dissolved in water and were rendered insoluble by treatment for 30 mins. at room temperature with 2% formaldehyde in a solution of the same composition as the coagulating bath.

The X-ray diagram of the fibre thus obtained has a typical α structure with a ring at 5.2 Å. and a doublet at 10.5 and 9.5 Å., but shows little orientation although some arcing of the reflection of the 10 Å. spacings can be detected. After stretching the fibres 100% in water a highly oriented α diagram is obtained which is almost identical with that of untreated wool. The only difference between the diffraction patterns of the native and regenerated fibre is the presence of weak β reflections in the latter which may be produced either by a small quantity of β protein or by some α-β transformation during the stretching.

This shows that it is possible to solubilise wool and bring it into true solution without losing the α configuration of the molecule and that on regeneration it crystallises into the same form as when produced by a biological synthesis. The solubilisation process, although involving extensive chemical reaction does not change the specific α molecular orientation of the molecule and can thus not be considered as denaturation since this always gives protein having a β structure.

6. 14 gms. of wool (weighed at normal regain) were allowed to stand in 40 ml. of peracetic acid solution (containing 40% of peracetic acid and 60% of acetic acid) and 60 ml. of water for 2 hours at room temperature. The wool was then washed with cold water and stirred with 1 litre of 0.2N ammonium hydroxide. After 2 hours the wool disintegrated and the solution was filtered. The clear yellow filtrate was made just acid to litmus with 2N sulphuric acid. The white curdy precipitate represented 58% of the original dry weight of the wool. The residue was retreated with peracetic acid and ammonia as described above and the insoluble product obtained was 8.5 to 9.0% of the original dry weight of the wool.

7. Example 6 was repeated but using one twenty-fifth of the concentration of peracetic acid and a time of treatment of 25 hours, and the same result was obtained.

8. 2 gms. of finely divided cow's horn were allowed to stand in 20 ml. of peracetic acid solution (containing 40% of peracetic acid and 60% of acetic acid) for 24 hours at room temperature. The product was washed with water and stirred with 1 litre of 0.2N ammonium hydroxide for 2 hours and the solution was filtered. The filtrate was made just acid to litmus with 2N sulphuric acid. The white curdy precipitate represented 52% of the original weight of the horn. The residue, amounting to 5%, was re-treated with peracetic acid and ammonia as described above.

9. 7 gms. of fine cow's horn shavings were stirred with 40 ml. of peracetic acid solution (containing 40% of peracetic acid and 60% of acetic acid) and 60 ml. of water for 2 hours at room temperature. The horn was then washed with cold water and stirred with 1 litre of 0.2N ammonium hydroxide. After 2 hours the horn disintegrated and the solution was filtered. The filtrate was made just acid to litmus with 2N sulphuric acid. The white curdy precipitate represented 51.5% of the original horn.

10. Example 6 was repeated using perpropionic acid instead of peracetic acid. The precipitate obtained from the ammonium hydroxide represented 49.5% of the original dry weight of the wool.

11. Example 6 was repeated using per-n-butyric acid instead of peracetic acid. The precipitate obtained from the ammonium hydroxide represented 39% of the original dry weight of the wool.

12. Example 6 was repeated using the same proportions of ingredients but employing peracetic acid solutions of varying pH values. The results are shown in Table II below.

*Table II*

| pH of peracetic acid solution | Percent precipitated from ammonium hydroxide soln. | Residue, percent | Percent precipitated on acidifying initial soln. |
|---|---|---|---|
| 2 | 60 | 9 | 0 |
| 4 | 54 | 12.7 | 0 |
| 7 | 36–52 | 3.4 | 3 |
| 9 | 17–36 | 49 | 0 |
| 10 | (¹) | (¹) | (¹) |

¹ Rapid decomposition.

13. Example 6 was repeated but using urea saturated at 18° C. and adjusted to pH 8 with sodium bicarbonate instead of ammonium hydroxide for effecting solution. The residue was 29% and on acidifying the urea solution with 2N sulphuric acid a white precipitate was obtained amounting to 45.8% of the original dry weight of the wool.

14. Example 6 was repeated ten times using the following as solvents instead of the ammonium hydroxide:

(a) 5% aqueous sodium bicarbonate solution (with heating);
(b) 100% phosphoric acid;
(c) 70% aqueous phosphoric acid (with heating);
(d) 30% aqueous sodium oleate (with heating);
(e) Saturated aqueous zinc chloride solution (with heating);
(f) Cuprammonium hydroxide;
(g) Copper ethylenediamine;
(h) Phenol saturated with water at 18° C. (with heating);
(i) 100% lithium bromide (100 gms. of salt in 100 ml. of water) in N/10 hydrochloric acid (with heating);
(j) Resorcinol (with heating).

What we claim is:

1. A process for the treatment of protein materials of high cystine content which comprises oxidising a protein material of high cystine content with a solution of a saturated per-aliphatic acid having up to four carbon atoms in the molecule to disrupt the disulfide bonds of said protein material without substantially attacking the remainder of the protein molecule and dissolving at least a part of the oxidised product thus obtained in a solvent.

2. A process for the treatment of protein materials of high cystine content which comprises oxidising a protein material of high cystine content with a solution of peracetic acid to disrupt the disulfide bonds of said protein material without substantially attacking the remainder of the protein molecule, and dissolving at least a part of the oxidised product thus obtained in a solvent.

3. A process for the treatment of protein materials of high cystine content which comprises oxidising a protein material of high cystine content with a solution of performic acid to disrupt the disulfide bonds of said protein material without substantially attacking the remainder of the protein molecule, and dissolving at least a part of the oxidised product thus obtained in a solvent.

4. A process for the treatment of protein materials of high cystine content which comprises oxidising a protein material of high cystine content with a solution of perpropionic acid to disrupt the disulfide bonds of said protein material without substantially attacking the remainder of the protein molecule, and dissolving at least a part of the oxidised product thus obtained in a solvent.

5. A process for the treatment of protein materials of high cystine content which comprises oxidising a protein material of high cystine content with a solution of perbutyric acid to disrupt the disulfide bonds of said protein material without substantially attacking the remainder of the protein molecule, and dissolving at least a part of the oxidised product thus obtained in a solvent.

6. A process for the treatment of protein materials of high cystine content which comprises oxidising a protein material of high cystine content with a solution of a saturated per-aliphatic acid having up to four carbon atoms in the molecule to disrupt the disulfide bonds of said protein material without substantially attacking the remainder of the protein molecule and dissolving at least a part of the oxidised product thus obtained in a dilute alkali.

7. A process for the treatment of protein materials of high cystine content which comprises oxidising a protein material of high cystine content with a solution of a saturated per-aliphatic acid having up to four carbon atoms in the molecule to disrupt the disulfide bonds of said protein material without substantially attacking the remainder of the protein molecule and dissolving at least a part of the oxidised product thus obtained in a dilute ammonia solution.

8. A process for the treatment of wool which comprises oxidising wool with a solution of a saturated per-aliphatic acid having up to four carbon atoms in the molecule to disrupt the disulfide bonds of the protein molecules of the wool without substantially attacking the remainder of the protein molecules, and dissolving at least a part of the oxidised product thus obtained in a solvent.

9. A process for the treatment of horn which comprises oxidising horn with a solution of a saturated per-aliphatic acid having up to four carbon atoms in the molecule to disrupt the disulfide bonds of the protein molecules of the horn without substantially attacking the remainder of the protein molecules, and dissolving at least a part of the oxidised product thus obtained in a solvent.

10. A process for the treatment of protein materials of high cystine content which comprises oxidising a protein material of high cystine content with a solution of a saturated per-aliphatic acid having up to four carbon atoms in the molecule to disrupt the disulfide bonds of said protein material without substantially attacking the remainder of the protein molecule, dissolving at least a part of the oxidised product thus obtained in a solvent and precipitating keratinous material from the solution by the addition of an acid.

11. A process for the treatment of protein materials of high cystine content which comprises oxidising a protein material of high cystine content with a solution of a saturated per-aliphatic acid having up to four carbon atoms in the molecule to disrupt the disulfide bonds of said protein material without substantially attacking the remainder of the protein molecule, dissolving at least a part of the oxidised product thus obtained in a solvent and salting out keratinous material from the solution by the addition of a strong salt solution.

12. A process for the treatment of protein materials of high cystine content which comprises oxidising a protein material of high cystine content with a solution of a saturated per-aliphatic acid having up to four carbon atoms in the molecule to disrupt the disulfide bonds of said protein material without substantially attacking the remainder of the protein molecule, dissolving at least a part of the oxidised product thus obtained in a solvent and spinning the solution to produce fibers.

13. A process for the treatment of protein materials of high cystine content which comprises oxidising a protein material of high cystine content with a solution of a saturated per-aliphatic acid having up to four carbon atoms in the molecule to disrupt the disulfide bonds of said protein material without substantially attacking the remainder of the protein molecule, dissolving at least a part of the oxidised product thus obtained in a solvent and extruding the solution to produce a shaped article.

14. A process for the treatment of protein materials of high cystine content which comprises oxidising a protein material of high cystine content with a solution of a saturated per-aliphatic acid having up to four carbon atoms in the molecule to disrupt the disulfide bonds of said protein material without substantially attacking the remainder of the protein molecule, dissolving at least a part of the oxidised product thus obtained in a solvent and evaporating a thin layer of the solution to produce a film.

15. A process for the treatment of wool which comprises oxidising wool with an aqueous solution of peracetic acid to disrupt the disulfide bonds of the protein molecules of the wool without substantially attacking the remainder of the protein molecules, and dissolving the oxidised product thus obtained in a dilute ammonia solution.

16. A process for the treatment of horn which comprises oxidising horn with an aqueous solution of peracetic acid to disrupt the disulfide bonds of the protein molecules of the horn without substantially attacking the remainder of the protein molecules, and dissolving the oxidised product thus obtained in a dilute ammonia solution.

17. A process for the treatment of protein materials of high cystine content which comprises oxidising a protein material of high cystine content with a solution of a saturated per-aliphatic acid having up to four carbon atoms in the molecule to disrupt the disulfide bonds of said protein material without substantially attacking the remainder of the protein molecule, dissolving the oxidised product in a dilute aqueous ammonia solution, salting out keratinous material from the solution by the addition of a strong electrolyte, separating the salted out product and dissolving the same in water.

PETER ALEXANDER.
CHRISTOPHER EARLAND.

REFERENCES CITED

The following references are of record in the file of this patent:

UNITED STATES PATENTS

| Number | Name | Date |
|---|---|---|
| 1,719,711 | Mathies et al. | July 2, 1929 |
| 2,425,550 | Lundgren | Aug. 12, 1947 |
| 2,445,028 | Jones et al. | July 13, 1948 |

OTHER REFERENCES

Goddard et al., J. Biol Chem., vol. 106, pp. 605–614 (1934).